United States Patent Office 3,238,239
Patented Mar. 1, 1966

3,238,239
PRODUCTION OF ACRYLIC ACID ESTERS AND AMIDES
Walter Schweckendiek and Walter Schliesser, both of Ludwigshafen (Rhine), Germany, assignors to Badische Anilin- & Soda-Fabrik Aktiengesellschaft, Ludwigshafen (Rhine), Germany
No Drawing. Filed Mar. 26, 1962, Ser. No. 182,675
Claims priority, application Germany, Mar. 29, 1961, B 61,945
9 Claims. (Cl. 260—455)

This invention relates to a process for the production of acrylic acid compounds from initial materials which hitherto have not been used for this purpose.

It is known that acrylic acid and its esters can be obtained by reacting acetylene with carbon monoxide and water or alcohols at elevated temperature and under increased pressure. Nickel catalysts, especially nickel bromide and the complex of nickel bromide with triphenylphosphine, have been used as catalysts for this reaction.

It is also known that acrylic acid is obtained by passing maleic acid or maleic anhydride together with steam over decarboxylation catalysts. Since this reaction requires high temperatures, the yield of the sensitive acrylic acid is only moderate.

It is an object of this invention to provide a process by which acrylic acid compounds are obtained from readily accessible maleic anhydride. Other objects and advantages of the invention will be evident from the following description.

In accordance with this invention the said objects and advantages are achieved by heating an ethylenedicarboxylic acid derivative of the general formula:

(II)

with a tertiary phosphine, tertiary arsine or tertiary stibine as catalyst. In this way acrylic acid compounds of the general formula:

$$CHR_1=CR_2-COX \qquad (I)$$

are obtained. In the formula $R_1$ denotes a hydrogen atom or a methyl group, $R_2$ has the same meaning and X denotes the radical of an alcohol, mercaptan or secondary amine which is attached by way of the hetero atom.

Esters, thioesters and amides of acrylic acid or methyl substituted acrylic acids may be prepared by the new process, depending on whether the initial materials are half-esters, half-thioesters or half-amides of ethylenedicarboxylic acids. For example ethyl acrylate is obtained from maleic acid monoethyl ester in accordance with the equation:

Ethyl acrylate, like the other products of the process, is obtained in very pure form. In particular there are no propionic acid or acetic acid derivatives in the reaction products. This is a special advantage of the process according to this invention.

The preferred initial materials of Formula II are derived from maleic acid. Derivatives of fumaric acid are however also suitable although in general they give somewhat lower yields of acrylic acid compounds. Other suitable initial materials are derived from citraconic acid and mesaconic acid.

The initial compounds of the general Formula II are obtained for example by reaction of the corresponding ethylenedicarboxylic acid anhydrides with alcohols, mercaptans or secondary amines in the mole ratio 1:1 or with a slight excess of the last-mentioned compounds. For example, it is possible to work with an about 10% excess of alcohol which need not be separated from the reaction product. In the subsequent decarboxylation, in some cases especially good results are achieved if the said or similar amounts of alcohol are present, for example up to 30 mol percent.

Ethylenedicarboxylic acid half-esters of the Formula II may be derived from aliphatic, cycloaliphatic or araliphatic alcohols. The preferred half-esters are derivatives of alcohols with up to eighteen carbon atoms which, apart from the hydroxyl group, have hydrocarbon structure. These alcohols may however also be substituted by groups or atoms which are inert under the conditions of the process. Examples of such substituents are ether bridges, hydroxyl groups, carboxyl groups, carboxylic acid ester groups, carbonamide groups and nitro groups. The following are examples of suitable half-esters of ethylenedicarboxylic acids: monomethyl maleate, monopropyl maleate, monoisopropyl maleate, monobutyl maleate, monoisobutyl maleate, monohexyl maleate, monononyl maleate, mono-2-ethylhexyl maleate, monododecyl maleate, monooctadecyl maleate, monocrotyl maleate, monoallyl maleate, monocyclohexyl maleate, monocyclooctyl maleate, monobenzyl maleate, mono-β-phenylethyl maleate, mono-β-methoxyethyl maleate, mono-2-nitropropyl maleate, mono-2-nitroethyl maleate, mono-γ-carboxybutyl maleate, mono-γ-carbethoxybutyl maleate, mono-β-hydroxyethyl maleate, mono-ε-hydroxyhexyl maleate, monomethyl fumarate, monoethyl fumarate, mono-2-ethylhexyl fumarate, monocyclohexyl fumarate, monoethyl citraconate and monobutyl mesaconate.

Of the ethylenedicarboxylic acid half-amides of the Formula II those are preferred which are derived from secondary amines which, apart from the nitrogen atom, have hydrocarbon structure and contain up to 18 carbon atoms. The hydrocarbon substituents of the secondary amines may however also carry atoms or groups which are inert under the conditions of the process. Examples of such substitutents are ether bridges, hydroxyl groups, carboxyl groups, carboxylic acid ester groups, carbonamide groups and nitro groups. Suitable half-amides include maleic acid mono-(bis-β-hydroxyethyl)-amide, maleic acid mono-(bis-β-methoxyethyl)-amide, maleic acid mono-dimethylamide, maleic acid monopyrrolidide, maleic acid monopiperidide, maleic acid mono-N-methylcyclohexylamide, maleic acid mono-N-methylanilide, maleic acid monodiphenylamide and fumaric acid monodiethylamide.

Of the acid ethylenedicarboxylic acid thioesters of the Formula II those are preferred which are derived from mercaptans having up to twelve carbon atoms and which, apart from the SH group, have hydrocarbon structure. Inert substitutents which may be present in the mercaptans are for eaxmple ether bridges, hydroxyl groups, carboxyl groups, carboxylic acid ester groups, carbonamide groups and nitro groups. Of compounds of the Formula II which are derived from mercaptans, the following are examples: the monoethythioester, monobutylthioester, monohexahydrobenzylthioester, monododecylthioester, monocyclohexylthioester, and monocarboxymethylthioester of maleic acid.

The most suitable catalysts are tertiary phosphines. Among the tertiary phosphines, tertiary arsines and tertiary stibines, those are preferred which have three hydrocarbon substitutents each with up to eighteen carbon atoms. These hydrocarbon substituents may however also contain inert groups or atoms, for example alkoxy groups with one to four carbon atoms. The best yields are achieved with triarylphosphines, triarylarsines and triarylstibines in which each aryl radical includes six to ten carbon atoms. The corresponding trialkyl compounds are suitable especially when they contain higher alkyl radicals, i.e., those with six to eighteen carbon atoms, because these compounds are difficultly volatile and therefore easily separated from the products of the process. It is recommended to carry out the process in the atmosphere of an inert gas, such as nitrogen, when catalysts containing alkyl substituents are used.

Arsines and stibines in general give lower yields of acrylic acid compounds than phosphines. The joint use of a phosphine and an arsine and/or stibine improves the yields which are obtained by the use of a phosphine alone. In this case the phosphine and arsine or stibine are used advantageously in the mole ratio 1:0.1 to 1:0.5. When working batchwise, the catalyst is advantageously used in an amount of 5 to 50 mol percent with reference to the initial material (II).

The following are examples of suitable catalysts: triphenylphosphine, tri-p-tolylphosphine, trinaphthylphosphine, tri-p-methoxyphenylphosphine, o,o'-diphenylylphenylphosphine, phenyldibutylphosphine, tridodecylphosphine, tristearylphosphine, triphenylarsine, triphenylstibine, dimethylnaphthylphosphine and P,P,P',P'-tetraphenylethylenediphosphine.

The catalytic activity of the phospines, arsines and stibines is further assisted by the addition of an activator. Especially suitable activators are metals, metal oxides, metal hydroxides, metal sulfides and metal salts. Suitable metals include aluminum, iron, cobalt, nickel and copper. Among heavy metal compounds, molybdenum oxide, tungsten oxide, silver oxide, cadmium oxide, zinc oxide, nickel oxide, cadmium sulfide, zinc sulfide, zinc carbonate, zinc hydroxide, iron oxide, iron pyrophosphate, zinc sulfate, manganese carbonate and lead acetate, are examples. Oxides, hydroxides, sulfides and salts of the alkali metals and alkaline earth metals have a specially favorable action. The following are examples of these compounds: sodium hydroxide, potassium carbonate, sodium hydrogen carbonate, sodium sulfate, sodium chloride, sodium acetate, potassium pyrophosphate, potassium dichromate, disodium hydrogen phosphate, calcium oxide, barium hydroxide, barium carbonate, barium sulfate, sodium sulfide and calcium sulfide. The activators are advantageously used in amounts of 1 to 50% by weight with reference to the catalyst. Red phosphorus is also suitable as an activator.

Obviously it is also possible to use a catalyst which comprises a phosphine, an arsine and/or stibine and one or more of the said activators.

The process according to this invention is carried out at a temperature between 60° and 500° C. When working in the liquid phase, a temperature between 60° and 300° C., preferably between 80° and 260° C., is applied. For the decarboxylation in the gas phase we prefer temperatures between 200° and 500° C., especially between 300° and 500° C.

By the coemployment of an inorganic activator, the temperature at which decarboxylation begins is lowered by almost 100° C. Whereas when using only a phosphine, arsine or stibine it is advantageous to carry out the process at 150° to 200° C. and to raise the temperature to 220° to 260° C. toward the end, decarboxylation sets in at 60° to 70° C. when an activator is present and proceeds at 80° to 150° C. at a satisfactory rate. It is desirable to carry out the new process at the lowest possible temperature because on the one hand the sensitive acrylic acid compounds, which tend to polymerize, are obtained under mild conditions, and on the other hand at the higher temperatures conversion of the acid maleic acid compounds into neutral fumaric acid derivatives with the splitting off of carbon dioxide and ethylene occurs to a certain extent. This is especially marked in the case of monomethyl maleate which is partly converted into dimethyl fumarate. Moreover acid maleic acid compounds are partly isomerized at the higher temperatures to acid fumaric acid derivatives which, as described above, are more difficult to decarboxylate.

The new process may be carried out for example by placing the catalyst, and the activator if such is used, in an agitated vessel, heating it to the reaction temperature and gradually adding the acid ethylenedicarboxylic acid derivative of the Formula II. It is possible to coemploy a solvent which has a high boiling point and is inert under the conditions of the process. Examples of such solvents are phthalic dinitrile, triphenylcarbinol and triphenylphosphine oxide. Tertiary bases, such as quinoline, favorably affect the consistency of the fused catalyst. It is also possible to add a polymerization inhibitor, such as tertiary-butylcatechol or hydroquinone. It is recommendable to add the acid ethylenedicarboxylic acid derivative gradually to the catalyst and to remove the acrylic acid compound formed immediately from the reaction mixture. In this way the concentration both of the initial material and the end product in the reaction mixture is kept low.

The acrylic acid derivatives are entrained from the reaction mixture by the carbon dioxide which is formed simultaneously. It is also possible, and even recommendable in the case of high-boiling acrylic acid compounds, to assist removal of the reaction product from the reaction mixture by the introduction of additional inert gas. A similar effect is achieved by dissolving the initial material in a solvent of low boiling point, such as benzene or ether, prior to its addition to the catalyst. The last traces of acrylic acid compound formed are advantageously removed under reduced pressure. The acrylic acid compounds are obtained in a very pure form and may if desired be further purified by distillation.

The catalyst may be used for several batches. It is remarkable that the yields do not reach a maximum value until the catalyst has been used for two or three reactions. When the yields begin to decrease, the bulk of the catalyst can be recovered by distillation of the residue under reduced pressure.

The catalyst and, if used, the activator may also be applied to a porous support, such as aluminum oxide or silica gel. The process may be carried out continuously by arranging such a supported catalyst in a vertical reaction tube and passing the liquid or vaporous initial material (II) over the heated catalyst. It is also possible to apply only the activator to a support and to pass the initial material (II) over the activator together with the catalyst in the vapor or liquid phase.

The invention is illustrated by, but not limited to, the following examples in which the parts mentioned are by weight.

*Example 1*

30 parts of triphenylphosphine is heated to 150° to 180° C. while stirring and 144 parts of monoethyl maleate is allowed to flow in slowly at this temperature. The volatile ethyl acrylate is condensed. Reaction is completed in twenty minutes. Toward the end, heating is intensified to 220° C. in order to remove the remaining ethyl acrylate from the reaction mixture. The condensate is distilled at atmospheric pressure. 60 parts of pure ethyl acrylate is obtained, i.e., 60% of the theory.

If a further 144 parts of monoethyl maleate is reacted with the same catalyst, the yield rises to 65% of the theory. In a third reaction, the yield is 68% of the theory.

By distillation under reduced pressure of the residue remaining after the third reaction, it is possible to recover 18 parts of triphenylphosphine.

Analogous results are achieved by using 30 parts of tri-p-tolylphosphine, 25 parts of trinaphthylphosphine, 20 parts of tri-p-methoxyphenylphosphine or 10 parts of o,o'-biphenylylphenylphosphine instead of 30 parts of triphenylphosphine and working under otherwise identical conditions.

Example 2

The procedure of Example 1 is followed but a mixture of 30 parts of triphenylphosphine and 10 parts of triphenylarsine is used as catalyst. The yield is 68% of the theory at the first reaction.

Similar results are also achieved by replacing the triphenylarsine by the same amount of triphenylstibine or by using 20 parts of tri-n-hexylphosphine or 25 parts of trioctadecylphosphine instead of the triphenylphosphine. When using either of the said aliphatic tertiary phosphines, it is advantageous to work in the atmosphere of an inert gas such as nitrogen.

Example 3

A catalyst is used consisting of 30 parts of triphenylphosphine and 10 parts of cadmium oxide. Decarboxylation takes place at 90° C. Otherwise the procedure is as described in Example 1. Ethyl acrylate is obtained in a yield of 70% of the theory.

Similar results are obtained by using, instead of triphenylphosphine, 20 parts of P,P,P′,P′-tetraphenylethylenediphosphine and, instead of cadmium oxide, 5 parts of iron (II) pyrophosphate.

Example 4

144 parts of monoethyl fumarate is reacted by the use of triphenylphosphine at a temperature of between 180° and 220° C., the conditions being otherwise those described in Example 1. Ethyl acrylate is obtained in a yield of 60% of the theory.

In an analogous way, 3-carboxypropyl-(1) acrylate is obtained from mono-3-carboxypropyl-(1) maleate, 3-carbethoxypropyl-(1) acrylate from mono-3-carbethoxypropyl-(1) maleate, 2-nitropropyl acrylate from mono-2-nitropropyl maleate and 2-(2′-hydroxyethyl)-ethyl-(1) acrylate from mono - 2 - (2′ - hydroxyethyl) - ethyl - (1) maleate.

Example 5

172 parts of monobutyl maleate is reacted within 25 minutes by the use of 30 parts of triphenylphosphine and 10 parts of cadmium oxide. The temperature is 100° C. at first and is raised to 230° C. toward the end of the reaction. 90 parts of pure butyl acrylate is obtained, i.e., 70.3% of the theory.

Similar results are achieved when the cadmium oxide is replaced by the same amount of silver oxide or zinc oxide.

If, after the catalyst has been used once, another 172 parts of monobutyl maleate is reacted and a weak stream of carbon dioxide is also led into the reaction mixture, 105 parts of pure butyl acrylate is obtained, i.e., 82.8% of the theory.

Example 6

205 parts of fused maleic acid mono-N-methylphenylamide is added within 30 minutes to a mixture of 25 parts of triphenylphosphine, 5 parts of cadmium oxide and 5 parts of nickel oxide. The temperature is at first 150° C. and is raised to 320° C. toward the end of the reaction. 80 parts of a red mixture is obtained from which 60 parts of N-methylphenylacrylamide is obtained by distillation; this is 37.2% of the theory.

*Analysis.*—Hydrogenation iodine number: Calculated 630. Found 628.

Example 7

30 parts of triphenylphosphine and 10 parts of anhydrous potassium carbonate are heated to 100° C. while stirring. At this temperature, 172 parts of monobutyl maleate is added to the catalyst within about twenty-five minutes. The temperature is gradually raised to 150° C. When all the half-ester has been added, the whole is heated for a short time at 250° C. The bulk of the butyl acrylate formed distills at 140° to 150° C. from the reaction mixture. 105 parts of crude butyl acrylate is obtained.

By using anhydrous sodium sulfate instead of anhydrous potassium carbonate, 102 parts of crude ester is obtained and with barium oxide 100 parts and with anhydrous iron pyrophosphate 110 parts.

The yield of pure butyl acrylate is about 80% of the theory in all cases.

Example 8

The procedure described in Example 1 is followed but instead of monoethyl maleate, equivalent esters with other alcohols are used, with the following results: 131 parts of monomethyl maleate gives 61 parts of methyl acrylate, 158 parts of monopropyl maleate gives 79.8 parts of propyl acrylate, 158 parts of monoisopropyl maleate gives 85.7 parts of isopropyl acrylate, 172 parts of monoisobutyl maleate gives 89.7 parts of isobutyl acrylate.

Example 9

The procedure described in Example 5 is followed but 5 parts of aluminum powder and, in another reaction, 5 parts of aluminum oxide is used instead of cadmium oxide. In two successive batches, using the same catalyst for both batches, 77.7 and 76.8% of the theory of butyl acrylate is obtained with aluminum powder and 77.8 and 78.1% of the theory with aluminum oxide.

Example 10

The procedure of Example 1 is followed but acid maleic acid esters of other alcohols are reacted with the results shown in the following table:

| Initial material | Reaction product | Boiling point or melting point °C. |
|---|---|---|
| Mono-2-ethylhexyl- maleate. | 2-ethylhexyl acrylate. | B.p. 90° C. at 10 mm. Hg. |
| Monocetyl maleate | Cetyl acrylate | B.p. 160–163° C. at 1.0 mm. Hg M.p. 23° C. |
| Monocrotyl maleate | Crotyl acrylate | B.p. 54–55° C. at 20 mm. Hg. |
| Mono-2-methoxy- ethyl maleate. | Methoxyethyl acrylate. | B.p. 65° C. at 17 mm. Hg. |
| Monocyclohexyl maleate. | Cyclohexyl acrylate. | B.p. 72° C. at 1 mm. Hg. |
| Mono-4-hydroxy- butyl-(1) maleate. | 4-hydroxy-butyl- (1) acrylate. | B.p. 100° C. at 0.5 mm. Hg. |

Example 11

The reaction product of 112 parts of citraconic anhydride and 50 parts of ethanol is reacted in the way described in Example 1 and ethyl crotonate (B.P. 138–140° C./760 mm. Hg) and ethyl methacrylate (B.P. 115–118° C./760 mm. Hg) are obtained.

Example 12

46 parts of 98% mercaptoacetic acid and 49 parts of maleic anhydride are heated at 140° to 150° C. Monocarboxymethylthiomaleate is formed with spontaneous heating up to 200° C.

The reaction product is gradually added to 20 parts of triphenylphosphine while stirring, the temperature being 150° C. at the beginning and 270° C. at the end. The carboxymethyl thioester of acrylic acid forms with the liberation of carbon dioxide. The thioester can be recovered by distilling the reaction mixture under reduced pressure. The product has the melting point 127° to 128° C.

The cyclohexylthioester and butyl thioester of acrylic acid are obtained in an analogous way from cyclohexylmercaptan or butylmercaptan and maleic anhydride.

We claim:
1. A process for the production of acrylic acid compounds of the formula

$$CHR_1=CR_2-COX \qquad (I)$$

in which $R_1$ is a member selected from the group consisting of hydrogen and methyl, $R_2$ is a member selected from the group consisting of hydrogen and methyl and X is a member selected from the group consisting of $-OR_3$, —$OR_4$, —$SR_5$, —$SR_6$, and the radical of a secondary amine connected via the nitrogen atom and having a hydrocarbon structure with from 1 to 18 carbon atoms except for the nitrogen atom, wherein $R_3$ is a hydrocarbon radical derived from a member selected from the group consisting of aliphatic, araliphatic, and cycloaliphatic alcohols and having from 1 to 18 carbon atoms, $R_4$ is a hydrocarbon radical derived from a member selected from the group consisting of aliphatic, araliphatic, and cycloaliphatic alcohols and having from 1 to 18 carbon atoms and further being substituted by a member selected from the group consisting of alkoxy, the hydroxyl group, the carboxyl group, the carbethoxy group, and the nitro group, and wherein $R_5$ is a hydrocarbon radical having from 1 to 12 carbon atoms and $R_6$ is

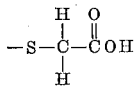

which comprises heating to a temperature between 60° and 500° C. an ethylenedicarboxylic acid derivative of the general formula:

  (II)

in which $R_1$, $R_2$ and X have the meanings given above with at least one catalyst selected from the group consisting of tertiary phosphines, tertiary arsines and tertiary stibines having 3 hydrocarbon substituents with 1 to 18 carbon atoms, and tertiary phosphines, arsines and stibines having 3 hydrocarbon substituents with 1 to 18 carbon atoms and being substituted by an alkoxy with 1 to 4 carbon atoms, and removing the acrylic acid compounds formed immediately from the reaction mixture.

2. A process as claimed in claim 1 wherein an inorganic activator is coemployed selected from the group consisting of cadmium oxide, potassium carbonate, aluminum powder and aluminum oxide.

3. A process as claimed in claim 1 wherein the reaction temperature is 80° to 260° C.

4. A process as claimed in claim 1 wherein the catalyst is a tertiary phosphine in admixture with at least one compound selected from the group consisting of tertiary arsines and tertiary stibines, the mole ratio of tertiary phosphine to said compounds being between 1:0.1 and 1:0.5.

5. A process as claimed in claim 1 wherein an inert gas is passed through the reaction mixture during the reaction.

6. A process as claimed in claim 1 wherein the initial derivative is dissolved in a low-boiling solvent.

7. A process as claimed in claim 1 wherein the tertiary compound is used applied to a support.

8. A process as claimed in claim 1 wherein the said catalyst is selected from the group consisting of triarylphosphines, triarylarsines and triarylstibines, each aryl having 6 to 10 carbon atoms.

9. A process for the production of ethyl acrylate which comprises heating monoethyl maleate with triphenylphosphine to a temperature between 60° and 500° C. and removing the ethyl acrylate formed immediately from the reaction mixture.

References Cited by the Examiner

UNITED STATES PATENTS 3,036,119  5/1962  Koch et al. _____ 260—486

FOREIGN PATENTS 1,134,751  4/1957  France.

CHARLES B. PARKER, *Primary Examiner.*